(12) United States Patent
Ito et al.

(10) Patent No.: US 8,029,049 B2
(45) Date of Patent: Oct. 4, 2011

(54) FENDER PANEL STRUCTURE

(75) Inventors: Shigeru Ito, Okazaki (JP); Yasuhide Fukuhara, Okazaki (JP); Koji Nishimura, Aichi (JP); Yasuyuki Kondo, Okazaki (JP); Yoshiaki Ohhashi, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/009,684

(22) Filed: Jan. 19, 2011

(65) Prior Publication Data

US 2011/0109124 A1 May 12, 2011

Related U.S. Application Data

(62) Division of application No. 11/709,705, filed on Feb. 23, 2007, now abandoned.

(30) Foreign Application Priority Data

Feb. 28, 2006 (JP) .................. 2006-051813
Mar. 29, 2006 (JP) .................. 2006-090299

(51) Int. Cl.
*B60N 99/00* (2006.01)
(52) U.S. Cl. ............. 296/198; 296/191; 296/193.01
(58) Field of Classification Search ............. 296/198, 296/29, 30, 191, 193.01
See application file for complete search history.

(56) References Cited

U.S. PATENT DOCUMENTS

| 215,164 A | 5/1879 | Richards |
|---|---|---|
| 1,521,933 A | 1/1925 | Drake |
| 5,226,695 A | 7/1993 | Flint et al. |
| 5,655,811 A | 8/1997 | Sekine et al. |
| 6,729,793 B2 | 5/2004 | Cordebar |
| 6,769,727 B2 | 8/2004 | Delavalle et al. |
| 6,997,491 B2 | 2/2006 | Takahashi |
| 7,086,679 B2 | 8/2006 | Andre et al. |
| 2003/0015882 A1 | 1/2003 | Nagae et al. |
| 2006/0001279 A1 | 1/2006 | Takahashi |
| 2007/0096482 A1 | 5/2007 | Matsui et al. |
| 2007/0284897 A1 | 12/2007 | Schwab |
| 2009/0174222 A1 | 7/2009 | Zellner, Jr. |

FOREIGN PATENT DOCUMENTS

| EP | 1 604 886 A2 | 12/2005 |
|---|---|---|
| JP | 63-34689 U | 3/1988 |
| JP | 06-18858 Y2 | 5/1994 |
| JP | 10-100817 A | 4/1998 |

(Continued)

OTHER PUBLICATIONS

Japanese Official Action dated Nov. 10, 2009 of Japanese Patent Application No. 2006-051813.

(Continued)

*Primary Examiner* — Lori Lyjak
(74) *Attorney, Agent, or Firm* — Birch, Stewart, Kolasch & Birch, LLP

(57) ABSTRACT

The fender panel structure includes a fender panel formed of resin, disposed above a vehicle's wheel, and forming an outer plate on the side face of the vehicle. The fencer panel has an outer plate part exposed to the side face of the vehicle, and a reinforcement part disposed in the rear face of an adjacent member next to the outer plate part and extending along an edge of the outer plate part, both of which are integrally formed. The fencer plate has a fitting part, into which the adjacent member fits, formed along the interstice between the edge of the outer plate part, and the reinforcement part.

4 Claims, 15 Drawing Sheets

FOREIGN PATENT DOCUMENTS

| | | |
|---|---|---|
| JP | 2000-108944 A | 4/2000 |
| JP | 2001-71942 A | 3/2001 |
| JP | 2003-11752 A | 1/2003 |
| JP | 2004-106573 A | 4/2004 |
| JP | 2005-297708 A | 10/2005 |

OTHER PUBLICATIONS

Japanese Official Action dated Nov. 10, 2009 of Japanese Patent Application No. 2006-090299.

FENDER PANEL STRUCTURE

This application is a Divisional of application Ser. No. 11/709,705, filed on Feb. 23, 2007 now abandoned, which claims priority under 35 U.S.C. §119(a) to Patent Application Nos. 2006-051813 filed in Japan on Feb. 28, 2006 and 2006-090299 filed in Japan on Mar. 29, 2006, all of which are hereby incorporated by reference into the present application.

BACKGROUND OF THE INVENTION

1. Field of the Invention

The present invention relates to fender panel structures.

2. Description of the Related Art

Conventionally, when assembling an automotive fender panel and a bumper facia that form an outer plate of a bumper, they are coupled together via a bumper bracket made of resin. This bumper bracket is mounted to the fender panel by means of a bolt or a clip, or the like. Moreover, a claw part which is provided at an end part of the bumper facia fits into a groove which is provided in this bumper bracket so as to couple the fender panel to the bumper facia. Such a structure improves the workability concerning mounting and demounting of the bumper facia in addition to securing the coupling strength between the fender panel and the bumper facia. Japanese Patent Application Laid-open Publication No. 2005-297708 discloses an example of such a fender panel structure.

Moreover, conventionally, when simultaneously coating the fender panel made of resin and the vehicle body frame in a vehicle assembly line, heat softens and deforms the fender panel, because the temperature in a paint oven becomes extremely high. For this reason, in order to restrict the deforming direction in this deformation to a desired direction, the fender panel is mounted to the vehicle body frame using a dedicated sliding clip, washer, or the like. Accordingly, the fender panel may contract to its original shape when it comes out of the paint oven and is cooled. Japanese Examined Utility Model Publication No. Hei 6-18858 discloses an example of such a fender panel structure.

However, in the fender panel structure disclosed in Japanese Patent Application Laid-open Publication No. 2005-297708, the cost increases because such a fender panel structure needs the bumper bracket for coupling the fender panel with the bumper facia. Moreover, because a plurality of members are used, it is difficult to secure parts accuracy and the alignment at the joint part between the fender panel and the bumper facia becomes poor. Furthermore, in a case where the fender panel is formed of resin, the rigidity at an edge, particularly at a corner of the edge decreases as compared with a case where it is formed of sheet metal. As a result, this portion will deform easily, and this deformation needs to be suppressed.

Moreover, in the fender panel structure disclosed in Japanese Examined Utility Model Publication No. Hei 6-18858, a dedicated sliding clip, washer, or the like may sometimes not be installed. This problem occurs in a case where an aligning portion with the bumper facia, at a front part of the fender panel, is located distant from the vehicle body frame, or where a space for installing the dedicated sliding clip, washer, or the like is difficult to secure. In these cases, the front part of the fender panel extends downward at heating in the paint oven and may not contract to the original location due to its own empty weight even when it comes out of the paint oven and is cooled. As a result, this causes a strain throughout the fender panel.

Accordingly, the present invention is intended to provide a fender panel structure capable of mounting a bumper facia to a fender panel accurately while improving the alignment at the joint part without using a bumper bracket as a separate part. In this fender panel structure, the fender panel structure is further capable of restricting a deformation in a desired direction without restricting a deformation to the forward of the front part of the fender panel, or to the direction parallel to a hood panel.

SUMMARY OF THE INVENTION

A fender panel structure of a first aspect of the present invention for solving the above-described problems, provides the following characteristics. The fender panel structure includes a fender panel formed of resin, disposed above a vehicle's wheel, and forms an outer plate on the side face of the vehicle. In such a fender panel structure, the fender panel has an outer plate part exposed to the side face of the vehicle, and a reinforcement part which is disposed in the back face of an adjacent member next to the outer plate part, and which extends along an edge of the outer plate part, all of which are integrally formed of resin. At the same time, the fender panel has a fitting part, into which the adjacent member fits, formed along the interstice between the edge of the outer plate part, and the reinforcement part.

A fender panel structure of a second aspect of the present invention for solving the above-described problems provides, in addition to the fender panel structure of the first aspect, the following characteristics. In the fender panel structure, the fitting part is formed long slit-shaped in the direction along the edge.

A fender panel structure of a third aspect of the present invention for solving the above-described problems provides, in addition to the fender panel structure of the first aspect, the following characteristics. In the fender panel structure, the reinforcement part is formed in a board thickness thicker than that of the outer plate part.

A fender panel structure of a fourth aspect of the present invention for solving the above-described problems provides, in addition to the fender panel structure of the first aspect, the following characteristics. In the fender panel structure, the edge is a corner edge.

A fender panel structure of a fifth aspect of the present invention for solving the above-described problems provides, in addition to the fender panel structure of the first aspect, the following characteristics. In the fender panel structure, an engaging claw projecting to the fitting part is formed in the reinforcement part, and a tip of the engaging claw is inserted into a locking part provided in the adjacent member.

A fender panel structure of a sixth aspect of the present invention for solving the above-described problems provides, in addition to the fender panel structure of the fifth aspect, the following characteristics. In the fender panel structure, a plurality of engaging claws are formed, and are disposed along the edge.

A fender panel structure of a seventh aspect of the present invention for solving the above-described problems provides, in addition to the fender panel structure of the fifth aspect, the following characteristics. In the fender panel structure, a cutout portion is formed at each of the two sides of the engaging claw.

A fender panel structure of an eighth aspect of the present invention for solving the above-described problems provides, in addition to the fender panel structure of the first aspect, the following characteristics. In the fender panel structure, a mount part to the vehicle is formed in the reinforcement part.

A fender panel structure of a ninth aspect of the present invention for solving the above-described problems provides, in addition to the fender panel structure of the eighth aspect, the following characteristics. In the fender panel structure, bottom support means that supports a front part of the fender panel from below is provided in the vehicle. A substantially horizontal receiving face is formed in the bottom support means. In a lower edge of the mount part, a contact part is formed that allows the direction, to which the fender panel thermally deforms, to be in the direction along the receiving face. At the same time, the contact part restricts the heat deformation in the direction intersecting with the receiving face by causing the fender panel 10 to come into contact with the receiving face.

A fender panel structure of a tenth aspect of the present invention for solving the above-described problems provides, in addition to the fender panel structure of the eighth aspect, the following characteristics. In the fender panel structure, a hood aligning part facing to a hood is formed in an upper edge of the outer plate part of the fender panel. A bottom support means that supports the front part of the fender panel from below is provided in the vehicle. A receiving face substantially in parallel to the hood aligning part is formed in the bottom support means. In a lower edge of the mount part, a contact part is formed that allows the direction, to which the fender panel thermally deforms, to be in the direction along the receiving face. At the same time, the contact part restricts the heat deformation in the direction intersecting with the receiving face by causing the fender panel to come into contact with the receiving face.

A fender panel structure of an eleventh aspect of the present invention for solving the above-described problems provides, in addition to the fender panel structure of the ninth aspect, the following characteristics. In the fender panel structure, the mount part is mounted to the vehicle via the bottom support means.

A fender panel structure of a twelfth aspect of the present invention for solving the above-described problems provides, in addition to the fender panel structure of the tenth aspect, the following characteristics. In the fender panel structure, the mount part is mounted to the vehicle via the bottom support means.

A fender panel structure of a thirteenth aspect of the present invention for solving the above-described problems provides, in addition to the fender panel structure of the ninth aspect, the following characteristics. In the fender panel structure, a bolt installation hole for installing a bolt is formed in each of the bottom support means and the mount part.

A fender panel structure of a fourteenth aspect of the present invention for solving the above-described problems provides, in addition to the fender panel structure of the tenth aspect, the following characteristics. In the fender panel structure, a bolt installation hole for installing a bolt is formed in each of the bottom support means and the mount part.

A fender panel structure of a fifteenth aspect of the present invention for solving the above-described problems provides, in addition to the fender panel structure of the ninth aspect, the following characteristics. In the fender panel structure, the bottom support means and the mount part are coupled together after painting.

A fender panel structure of a sixteenth aspect of the present invention for solving the above-described problems provides, in addition to the fender panel structure of the tenth aspect, the following characteristics. In the fender panel structure, the bottom support means and the mount part are coupled together after painting.

A fender panel structure of a seventeenth aspect of the present invention for solving the above-described problems provides, in addition to the fender panel structure of the ninth aspect, the following characteristics. In the fender panel structure, the bottom support means is integrally formed with a vehicle body frame.

A fender panel structure of an eighteenth aspect of the present invention for solving the above-described problems provides, in addition to the fender panel structure of the tenth aspect, the following characteristics. In the fender panel structure, the bottom support means is integrally formed with the vehicle body frame.

In the first aspect of the present invention, the fender panel structure includes a fender panel formed of resin, disposed above a vehicle's wheel and forming an outer plate on the side face of the vehicle. In such a fender panel structure, a fender panel has the outer plate part exposed to the side face of the vehicle. In addition, the reinforcement part is disposed in the back face of the adjacent member next to the outer plate part, and extends along an edge of the outer plate part. The outer plate part and the reinforcement part are integrally formed of resin. At the same time, the fender panel has the fitting part, into which the adjacent member fits, formed along the interstice between an edge of the outer plate part, and the reinforcement part. Accordingly, the integral forming of the bumper bracket member can prevent the strain at the edge of the fender panel made of resin, increase the rigidity, and at the same time can improve the alignment with the bumper facia and the mountability.

In the second aspect of the present invention, the fitting part is formed long slit-shaped in the direction along the edge, thereby allowing the alignment with the bumper facia to be improved further.

In the third aspect of the present invention, the reinforcement part is formed in a board thickness thicker than that of the outer plate part, thereby allowing the rigidity of the edge to be improved further.

In the fourth aspect of the present invention, because the edge is a corner edge, especially the bumper bracket member may improve the rigidity of the corner edge to prevent the strain of the fender panel made of resin.

In the fifth aspect of the present invention, in the reinforcement part, the engaging claw projecting to the fitting part is formed. A tip of the engaging claw is inserted into the locking part provided in the adjacent member. Thus, this allows the fender panel and the bumper facia to be directly engaged together and held while causing the bumper facia to follow the outer plate part. As a result, the alignment between the two can be improved further.

In the sixth aspect of the present invention, a plurality of engaging claws are formed and disposed along the edge, thereby improving the alignment further.

In the seventh aspect of the present invention, a cutout portion is formed at each of the two sides of the engaging claw 1, thereby facilitating the removal of the bumper facia.

In the eighth aspect of the present invention, a mount part to the vehicle is formed in the reinforcement part, thereby allowing the positioning of the fender panel to be carried out more securely by the mount part to the vehicle. Consequently, this allows the alignment with the bumper facia to be carried out more securely.

In the ninth aspect of the present invention, the bottom support means that supports the front part of the fender panel from below is provided in the vehicle. In the bottom support means, the substantially horizontal receiving face is formed. In the lower edge of the mount part, the contact part is formed that allows the direction, to which the fender panel thermally deforms, to be in the direction along the receiving face. At the same time, the contact part, restricts the heat deformation in the direction intersecting with the receiving face by causing the fender panel to come into contact with the receiving face. Accordingly, the front part of the fender panel may be prevented from extending downward at painting, so that the deformation of the fender panel after painting can be controlled.

In the tenth aspect of the present invention, the hood aligning part facing to the hood is formed in an upper edge of the outer plate part of the fender panel. The bottom support means that supports the front part of the fender panel from below is provided in the vehicle. The receiving face is substantially in parallel to the hood aligning part is formed in the bottom support means. In the lower edge of the mount part, the contact part is formed that allows the direction, to which the fender panel thermally deforms, to be in the direction along the receiving face. At the same time, the contact part restricts the heat deformation in the direction intersecting with the receiving face by causing the fender panel to come into contact with the receiving face. Accordingly, all of this facilitates the deformation in the extending direction of the aligning part with the hood and prevents the deformation in the hood direction, so that the interference with the hood can be prevented.

In the eleventh aspect of the present invention, the mount part is mounted to the vehicle via the bottom support means, thereby allowing mounting with accuracy and also allowing the structure to be simplified. Thus, the manufacturing cost can be reduced.

In the twelfth aspect of the present invention, the mount part is mounted to the vehicle via the bottom support means, thereby allowing for mounting with accuracy and also allowing the structure to be simplified. Thus, the manufacturing cost can be reduced.

In the thirteenth aspect of the present invention, the bolt installation hole for installing a bolt is formed in each of the bottom support means and the mount part. Accordingly, the expansion of the fender panel at painting is no longer a concern, thereby making no longer necessary the dedicated sliding clip, washer, or the like. Thus, the cost may be reduced.

In the fourteenth aspect of the present invention, the bottom support means and the mount part include the bolt installation hole 116 for installing a bolt. Accordingly, the expansion of the fender panel 10 at painting is no longer a concern, so that the dedicated sliding clip, washer, or the like is no longer necessary. Thus, the cost can be reduced.

In the fifteenth aspect of the present invention, the bottom support means and the mount part are coupled together after painting. This allows the front part of the fender panel to be deformed freely in the directions other than downwards at painting. Accordingly, after the painting, the fender panel bracket and the fender panel bracket coupling part can be coupled together securely.

In the sixteenth aspect of the present invention, the bottom support means and the mount part are coupled together after painting. This allows the front part of the fender panel to be deformed freely in the directions other than downwards at painting. Accordingly, after the painting, the fender panel bracket and the fender panel bracket coupling part can be coupled together securely.

In the seventeenth aspect of the present invention, the bottom support means is integrally formed with the vehicle body frame. Accordingly, the horizontal type fender panel bracket can improve the coupling strength with the vehicle body frame and can also reduce the number of components. Thus, the cost can be reduced.

In the eighteenth aspect of the present invention, the bottom support means is integrally formed with the vehicle body frame. Accordingly the horizontal type fender panel bracket can improve the coupling strength with the vehicle body frame and can also reduce the number of components. Thus, the cost can be reduced.

DETAILED DESCRIPTION OF THE INVENTION

A plurality of embodiments of the fender panel structure of the present invention will be described in accordance with FIG. 1 to FIG. 15. In the figures, the Fr indicates the forward of a vehicle, In indicates the inside in the vehicle width direction, and Up indicates the upward of the vehicle.

First Embodiment

Figure 5:
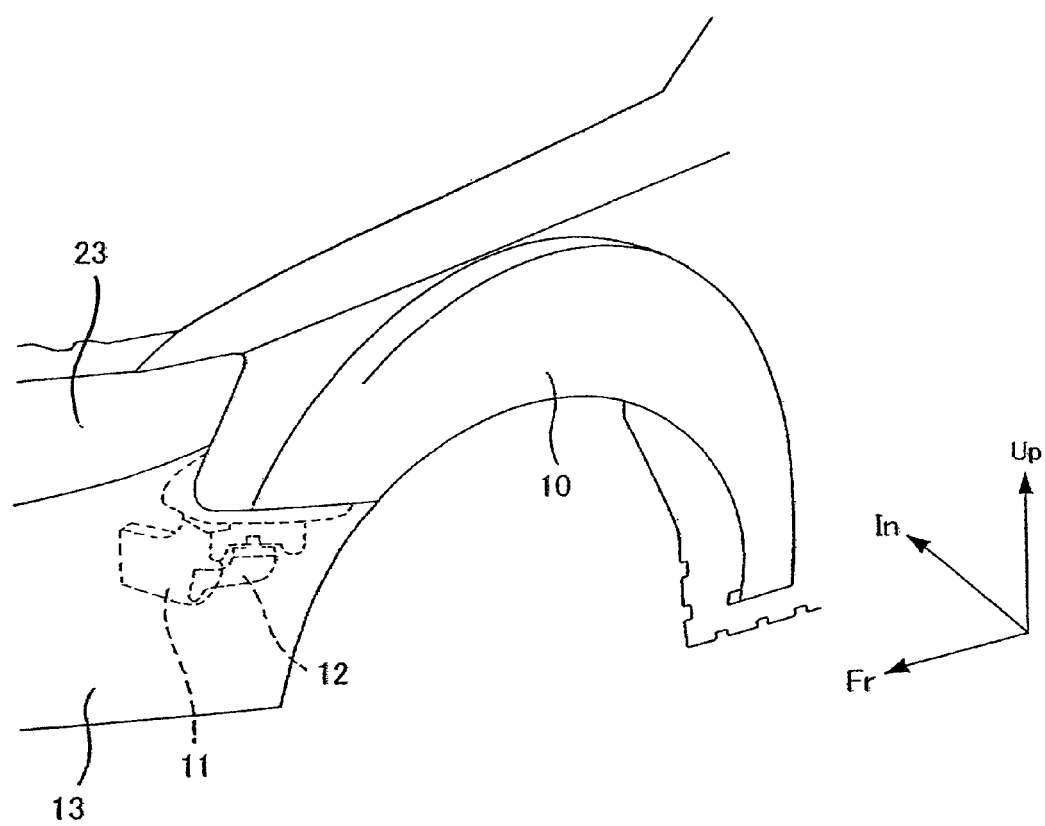
FIG. 5 is a perspective view of a front part of a vehicle concerning the first embodiment.

Hereinafter, the outline of a fender panel structure concerning this embodiment will be described. As shown in FIG. 5, a fender panel 10 forming an outer plate of a vehicle body is installed on the side of the front part of a vehicle. This fender panel 10 is supported by vehicle body frame members. A lower part of the front part of the fender panel 10 is supported by a bumper reinforcement 11 that reinforces a bumper. In addition, the fender panel concerning this embodiment is formed of resin.

The lower part of the front part of a fender panel 10 and the bumper reinforcement 11 are coupled together via a fender panel bracket 12. This fender panel bracket 12 and the bumper reinforcement 11 are coupled together by welding or by a bolt. Moreover, a head lamp 23 is installed in front of the fender panel 10.

The upper face of the end part of a bumper facia 13 is mounted to the lower part of the front part of the fender panel 10. In this embodiment, the front edge or lower edge of the fender panel 10 and the upper periphery of the bumper facia 13 are mounted adjacently so as to form a continuous outer plate.

Figure 1:
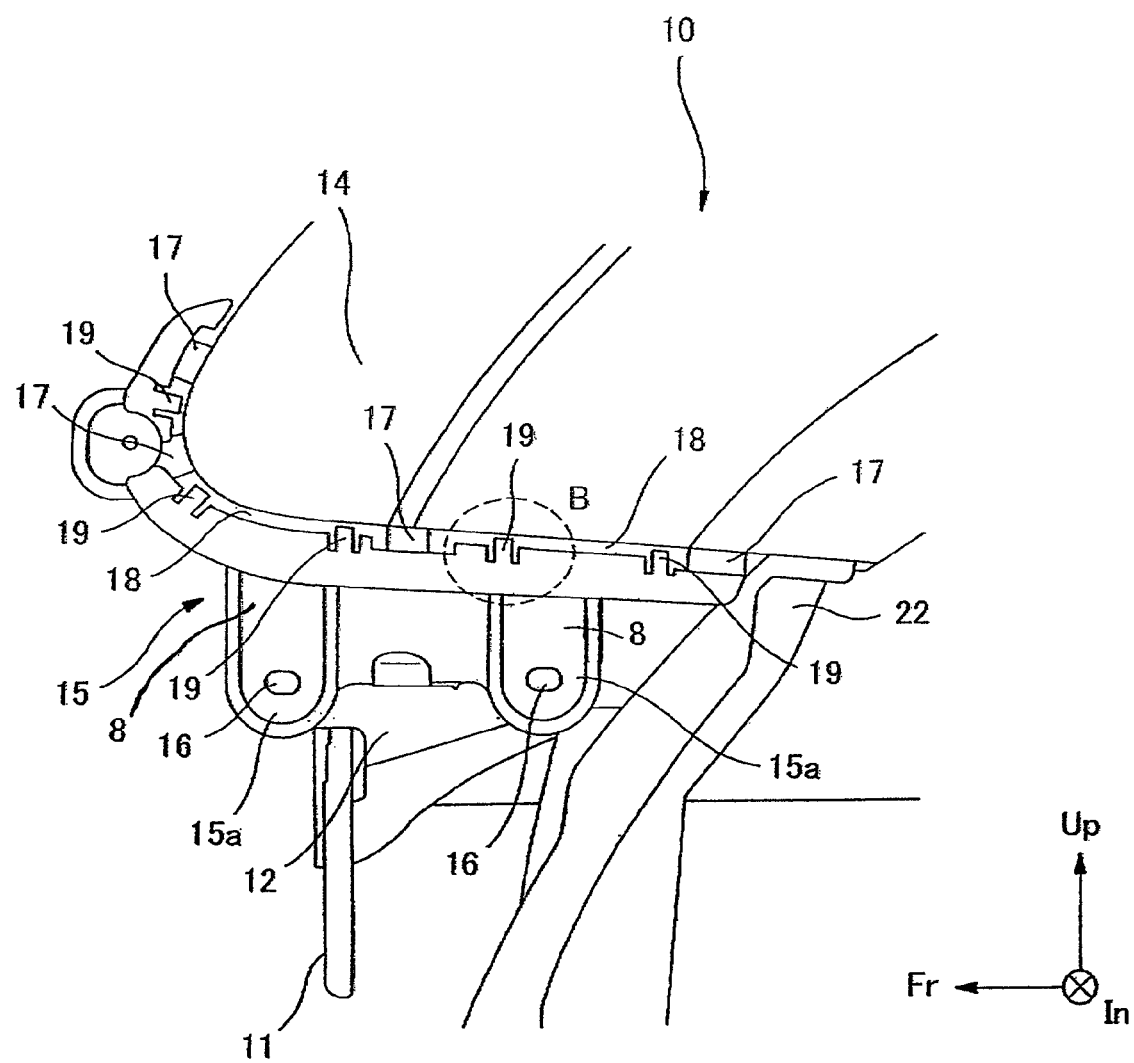
FIG. 1 is a side view of a fender panel structure concerning a first embodiment.

Next, the configuration of the principal part of the fender panel structure concerning this embodiment is described. As shown in FIG. 1, in the lower part of the front part of the fender panel 10, a bumper bracket member 15, which holds the bumper facia 13 (see FIG. 3) on a fender panel body 14 side, is installed so as to follow the edge from the front end portion of the fender panel body 14 to the vicinity of a wheel house 22.

This bumper bracket member 15 may be weld-bonded to the fender panel body 14 for integrally forming, or may be formed simultaneously with the fender panel body 14 to constitute the fender panel. In a lower part 15a of this bumper bracket member 15, there is provided a bolt through-hole 16 for installing a bolt that fixes the lower part of the front part of the fender panel 10 to the fender panel bracket 12 securely.

The bumper bracket member 15 and the fender panel body 14 are coupled together at four connection parts 17, and a slit 18, into which a part of periphery of the bumper facia 13 (see FIG. 3) fits, is formed between the bumper bracket member 15 and the fender panel body 14.

Figure 3:
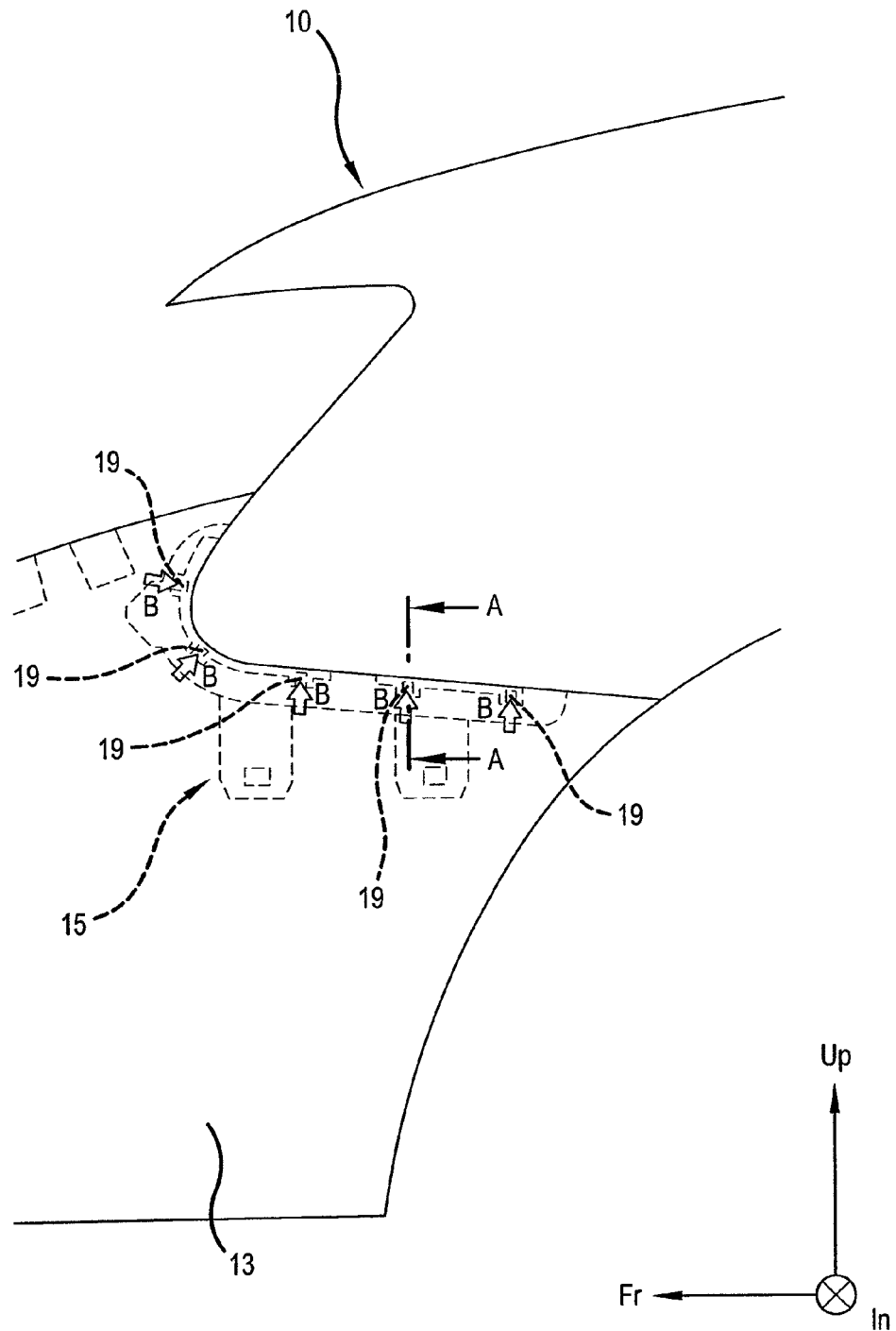
FIG. 3 is a side view when a bumper facia is mounted to the fender panel structure concerning the first embodiment.
Figure 4:
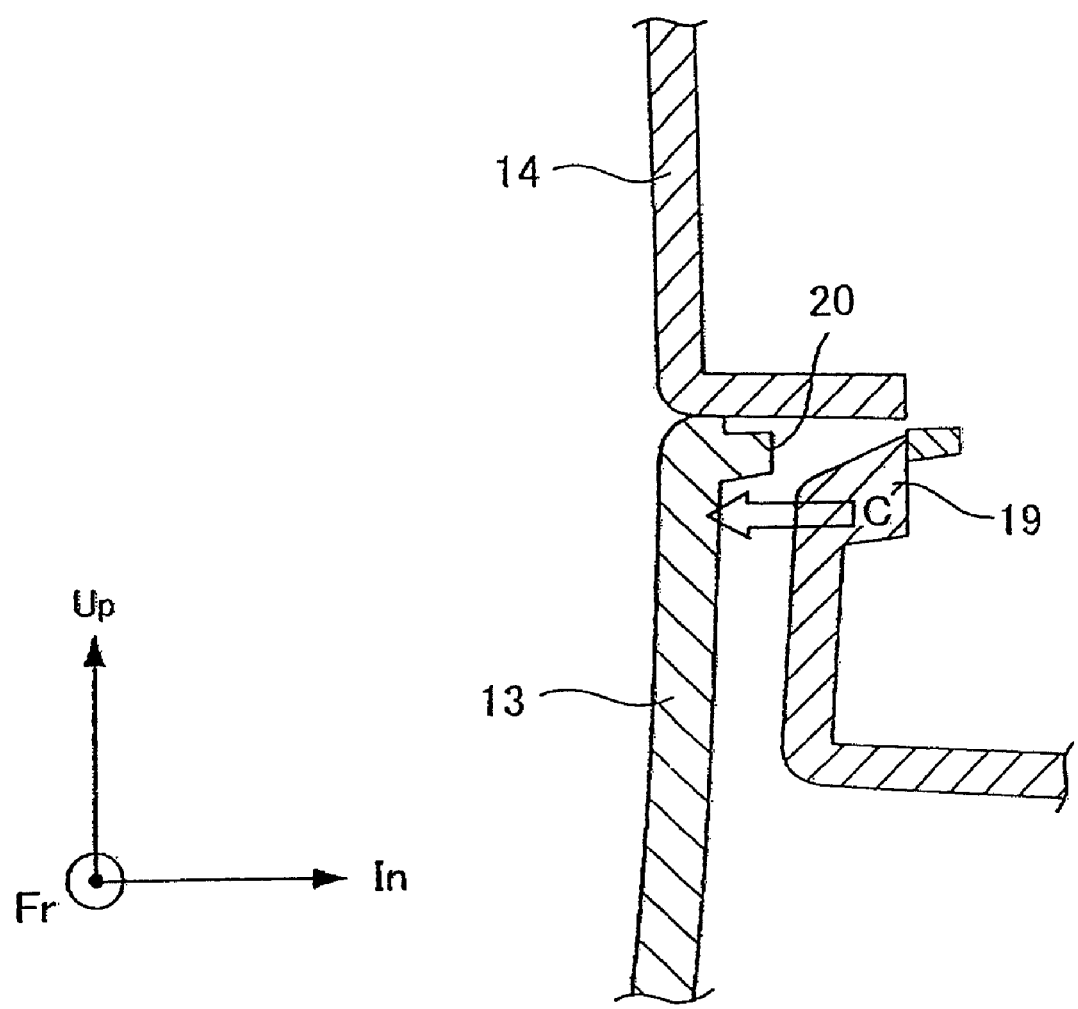
FIG. 4 is a cross sectional view corresponding to a cross section taken along the line A-A in FIG. 3.

Moreover, in the bumper bracket member 15, as shown in FIG. 3, there is provided a protruding engaging claw 19 that holds the bumper facia 13 securely when the fender panel 10 is coupled with the bumper facia 13. As shown in FIG. 4 showing a cross section shown by A-A of FIG. 3, this engaging claw 19 connects firmly with an engaging claw insertion hole 20 (locking part) provided at an end part of the bumper facia 13 side.

Figure 2:
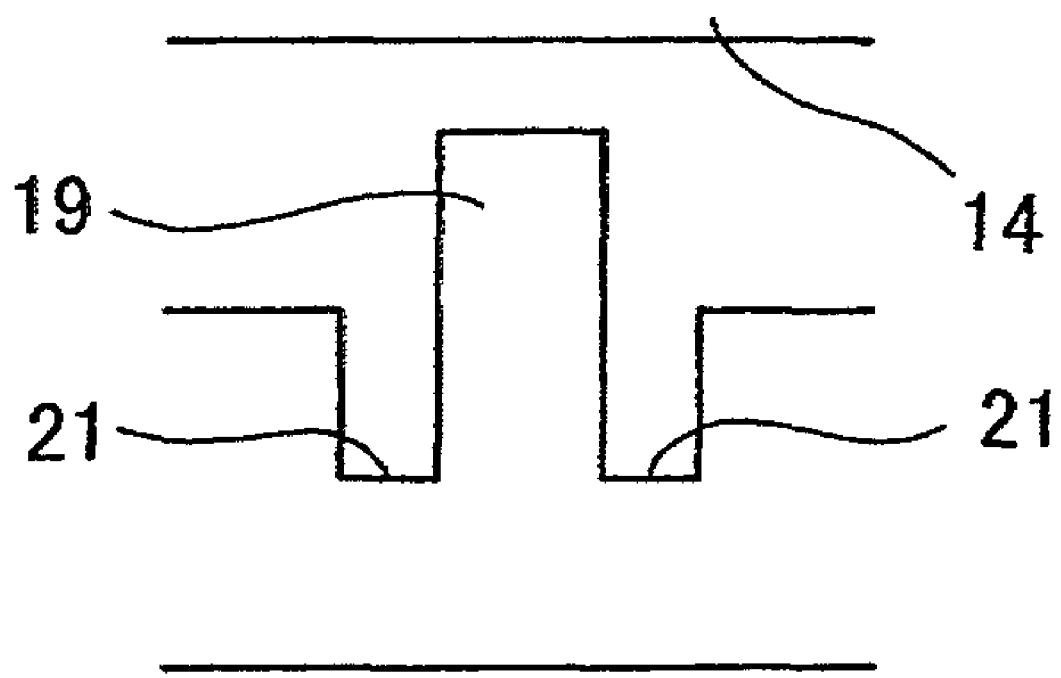
FIG. 2 is an enlarged view of a portion shown as a broken line B in FIG. 1.

As shown in FIG. 2 that is an enlarged view of the engaging claw 19, a cutout portion 21 is provided at both sides of a root portion of this engaging claw 19. The depth of this cutout portion 21 is set to the extent that the engaging claw 19 maintains the rigidity not to break easily, and to the extent that when removing the bumper facia 13, the engaging claw 19 will elastically deform in the direction shown by an arrow C of FIG. 4. Thus, this facilitates the removal of the bumper facia 13.

Moreover, the bumper bracket member 15 also has rigidity at a corner of the front end portion of the fender panel 10. That is, the bumper bracket member 15 is the connection part between the fender panel 10 and the bumper facia 13. At the same time, the bumper bracket member 15 also suppresses deformation of the corner of the front end portion of the fender panel 11.

Although in this embodiment a structure has been described in which the bumper bracket member 15 is provided in the lower part of the front part of the fender panel 10 made of resin, the structure described in this embodiment may be also applicable to members made of resin other than the fender panel 10.

In addition, the fender panel structure concerning this embodiment may be applicable not only to a front fender disposed at the front part of the vehicle body but also to a rear fender disposed on the side of the rear portion as well as to various adjacent members (rear lamp, rear bumper, or the like).

As described above, according to the fender panel structure concerning this embodiment, in the fender panel structure formed of resin, the fender panel structure is disposed above a vehicle's wheel and forms an outer plate on the side face of the vehicle. In this fender panel structure, the fender panel 10 has an outer plate part exposed to the side face of the vehicle, the bumper bracket member 15 that is disposed in the rear face of the bumper facia 13 adjacent to the fender panel 10 and extends along the edge of the fender panel 10. The outer plate part and the bumper bracket member 15 are integrally formed of resin. At the same time, the fender panel 10 has the slit 18, into which the bumper facia 13 fits, formed along between the edge and the bumper bracket member 15. Accordingly, integrally forming the bumper bracket member 15 may prevent the strain of the edge of the fender panel 10 made of resin, increase the rigidity, and at the same time may improve the alignment with the bumper facia 13 and the mountability.

Moreover, the slit 18 is formed long slit-shaped in the direction along the edge, thereby allowing the alignment with the bumper facia 13 to be improved further. Moreover, the bumper bracket member 15 is formed in a board thickness thereof thicker than that of the fender panel body 14, thereby allowing the rigidity of the edge to be improved further. Moreover, because the edge is a corner edge, especially the bumper bracket member 15 allows the rigidity of the corner edge to be improved, so that the strain of the fender panel 10 made of resin may be prevented.

Moreover, in the bumper bracket member 15, the engaging claw 19 projecting to the slit 18 is formed, and a tip of the engaging claw 19 is inserted in an engaging claw insertion hole 20 provided in the bumper facia 13. Accordingly, this allows the fender panel 10 and the bumper facia 13 to be directly engaged and held while causing the bumper facia 13 to follow the fender panel body 14. Thus, the alignment of the both may be improved.

Moreover, a plurality of the engaging claws 19 are formed and disposed along the edge, thereby improving the alignment.

Moreover, a cutout portion 21 is formed at both sides of the engaging claw 19, thereby facilitating the removal of the bumper facia 13.

Moreover, a mount part 8 to the vehicle is formed in the bumper bracket member 15, thereby allowing the positioning of the fender panel 10 to be carried out more securely at the mount part to the vehicle. This allows the alignment with the bumper facia 13 to be carried out more securely.

Second Embodiment

Hereinafter, a fender panel structure concerning this embodiment will be described. In this embodiment, a head lamp 23 is formed in a shape covering the upper face of the front end portion of the fender panel 10. The structures other than the shape of such a head lamp 23 and the installation of a reinforcement part for coupling this head lamp 23 with the fender panel 10 are substantially the same as those of the fender panel structure concerning the first embodiment. That is, assume that the bumper bracket member 15 and the like that couple the fender panel 10 with the bumper facia 13 are installed.

Figure 6:
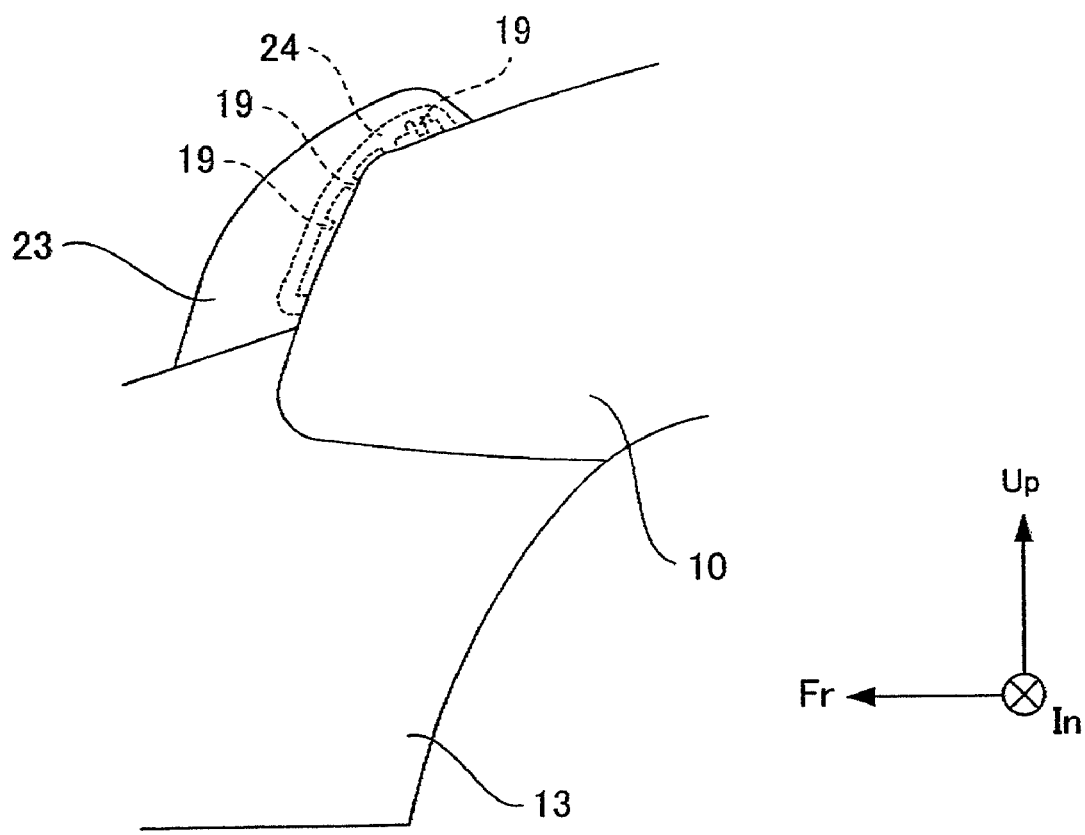
FIG. 6 is a side view of a fender panel structure concerning a second embodiment.

As shown in FIG. 6, the head lamp 23 is installed so as to cover the front part and upper part (i.e., corner edge) of the front end portion of the fender panel 10. In the front part and upper part of the front end portion of the fender panel 10, a head lamp bracket member 24 is integrally formed with the fender panel 10. In other words, this head lamp bracket member 24 is formed so as to extend to a contact face between the fender panel 10 and the head lamp 23.

The head lamp bracket member 24 is provided with the engaging claw 19. This engaging claw 19 is formed in a shape for engaging with the end part of the head lamp 23. Namely, this engaging claw 19 is engaged with the end part of the head lamp 23, so that the end part of the head lamp 23 is fixed to the fender panel 10. That is, in this embodiment, a similar structure to the structure for coupling the fender panel 10 with the bumper facia 13 in the first embodiment is applied to couple the fender panel 10 with the head lamp 23.

As described above, according to the fender panel structure concerning this embodiment, in the fender panel structure formed of resin, the fender panel structure is disposed above a vehicle's wheel and forms an outer plate on the side face of the vehicle. In this fender panel structure, the fender panel 10 has the fender panel body 14 exposed to the side face of the vehicle, and the head lamp bracket member 24 that is disposed in the rear face of the head lamp 23 adjacent to the fender panel 10 and extends along the edge of the fender panel 10, all of which are integrally formed of resin. At the same time, the fender panel 10 has the slit 18, into which the head lamp 23 fits, formed along between the edge and the head lamp bracket member 24. Accordingly, integrally forming the head lamp bracket member 24 may prevent the strain of the edge of the fender panel 10 made of resin, increase the rigidity and at the same time may improve the alignment with the head lamp 23 and the mountability.

Moreover, the slit 18 is formed long slit-shaped in the direction along the edge, thereby allowing the alignment with the head lamp 23 to be improved further.

Moreover, the head lamp bracket member 24 is formed in a board thickness thereof thicker than that of the fender panel body 14, thereby allowing the rigidity of the edge to be improved further.

Moreover, because the edge is a corner edge, especially the head lamp bracket member 24 may improve the rigidity of the corner edge to prevent the strain of the fender panel 10 made of resin.

Moreover, in the head lamp bracket member 24, the engaging claw 19 projecting to the slit 18 is formed, and the tip of the engaging claw 19 is inserted into the engaging claw insertion hole 20 provided in the head lamp 23. Accordingly, this allows the fender panel 10 and the head lamp 23 to be directly engaged and held while causing the head lamp 23 to follow the fender panel 10. Thus, the alignment of the both may be improved.

Moreover, a plurality of the engaging claws 19 are formed and disposed along the edge, thereby improving the alignment.

Moreover, the cutout portion 21 is formed at both sides of the engaging claw 19, thereby facilitating the removal of the head lamp 23.

Third Embodiment

Figure 11:
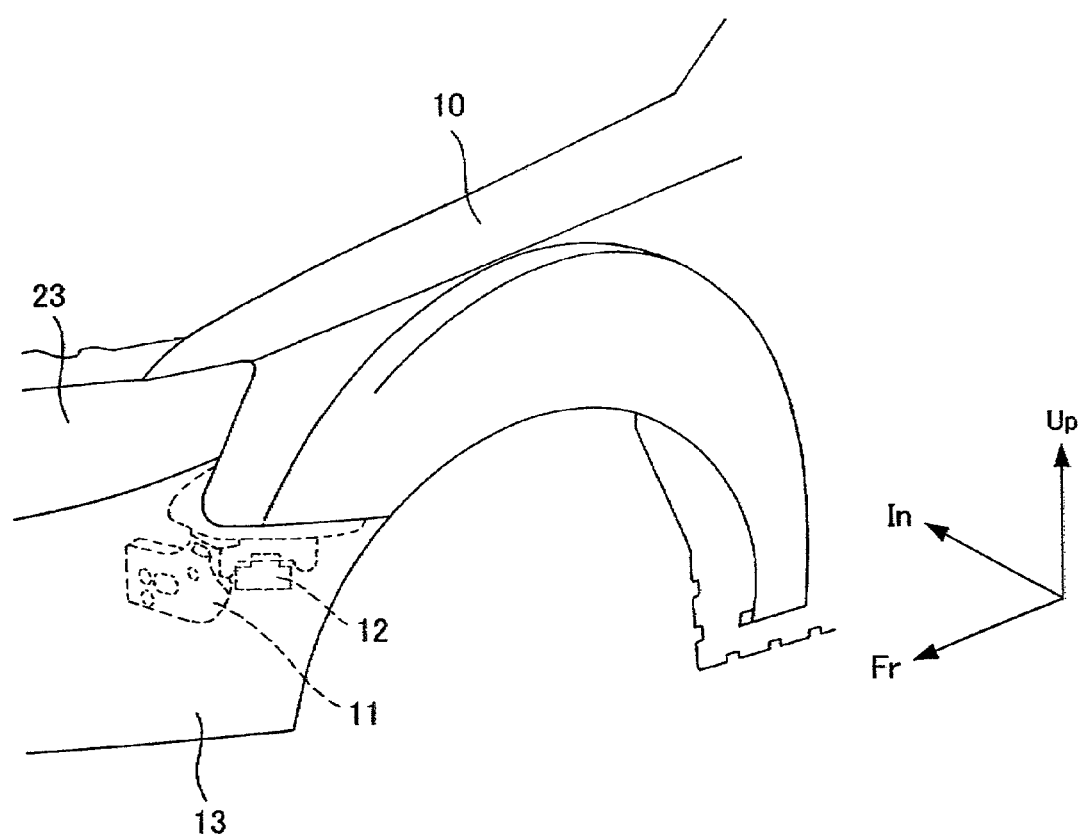
FIG. 11 is a perspective view of the fender panel structure made of resin concerning the third embodiment.

Hereinafter, a fender panel structure concerning this embodiment will be described. In this embodiment, a structure for preventing the front part of the fender panel 10 from extending downward at painting is further provided in the fender panel structure concerning the first or second embodiment. As shown in FIG. 11, the fender panel 10 forming the outer plate of a vehicle body is installed on the side of the front part of the vehicle. In this embodiment, the fender panel 10 is formed of resin. The bumper facia 13 is mounted in a lower part of the front part of the fender panel 10, and the head lamp 23 is mounted on the upper side of the front part of the fender panel 10.

The bumper reinforcement 11 for reinforcing the bumper facia 13 is installed inside the bumper facia 13. The lower part of the front part of the fender panel 10 is supported by the fender panel bracket 12 mounted on an end part of this bumper reinforcement 11.

Moreover, the end part of the bumper facia 13 is fitted into the lower part of the front part of the fender panel 10 supported by the fender panel bracket 12. Accordingly, the surface of the fender panel 10 and the surface of the bumper facia 13 form a continuous face.

Figure 8:
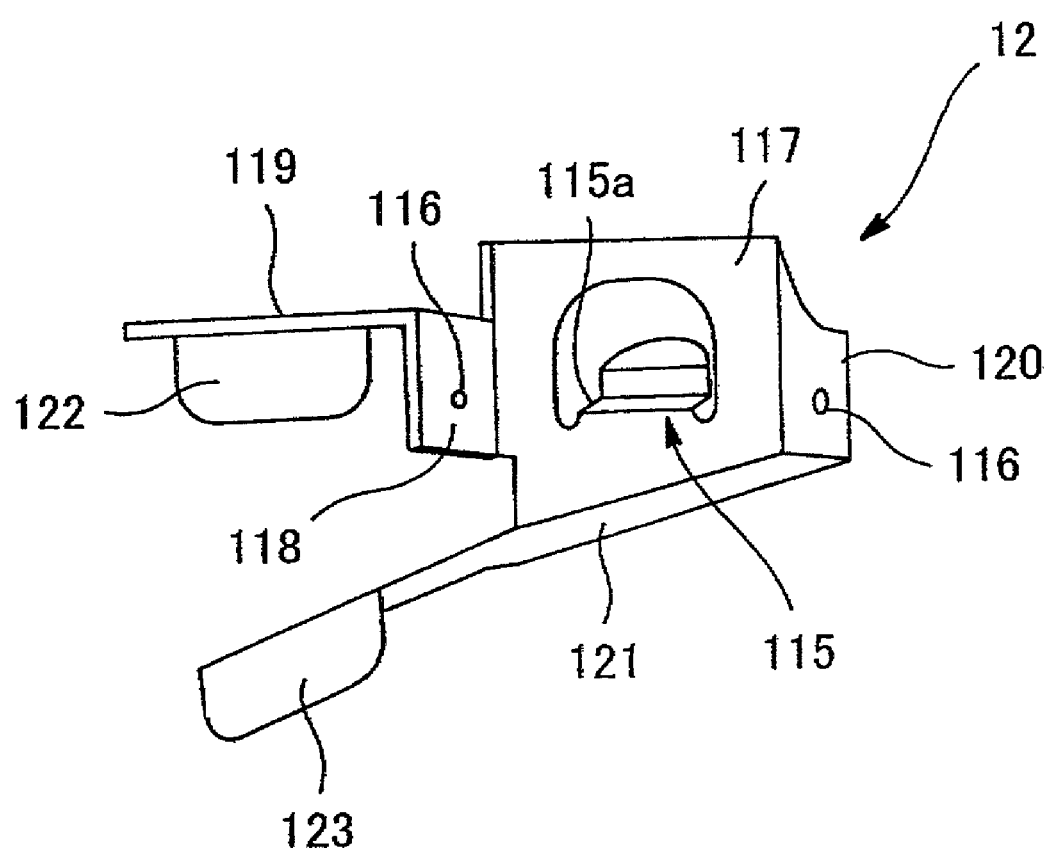
FIG. 8 is a perspective view of a fender panel bracket concerning the third embodiment.

As shown in FIG. 8, the fender panel bracket 12 is provided with a bottom support hook part 115 in the shape of hook. The bottom support hook part is folded back upwardly. At the both sides of this bottom support hook part 115, there is provided a bolt installation hole 116 for installing a bolt that couples the fender panel 10 with the fender panel bracket 12.

The upper part of a face 118 in front of a hook face 117, in which the bottom support hook part 115 of the fender panel bracket 12 is provided, is a front mount arm part 119 that is mounted to the bumper reinforcement 11. The front mount arm part 119 is folded back in the direction opposite to the direction to which the bottom support hook part 115 extends. Moreover, the lower part of the hook face 117 and the lower part of a rear face 120 constitutes a rear mount arm part 121 that is mounted to the bumper reinforcement 11. The rear mount arm part 121 is folded back in the direction opposite to the direction to which the bottom support hook part 115 extends.

The end part at the rear side of the front mount arm part 119 is a front mount part 122. When this is mounted to the bumper reinforcement 11, the end part on the rear side of the front mount arm part 119 is folded back downwardly. Moreover, the end part on the front side of the rear mount arm part 121 is a rear mount part 123, when this is mounted to the bumper reinforcement 11, the end part at the front side of the rear mount arm part 121 is folded back downwardly. In this embodiment, the fender panel bracket 12 is the bottom support means described in Summary of the Invention.

Figure 9:
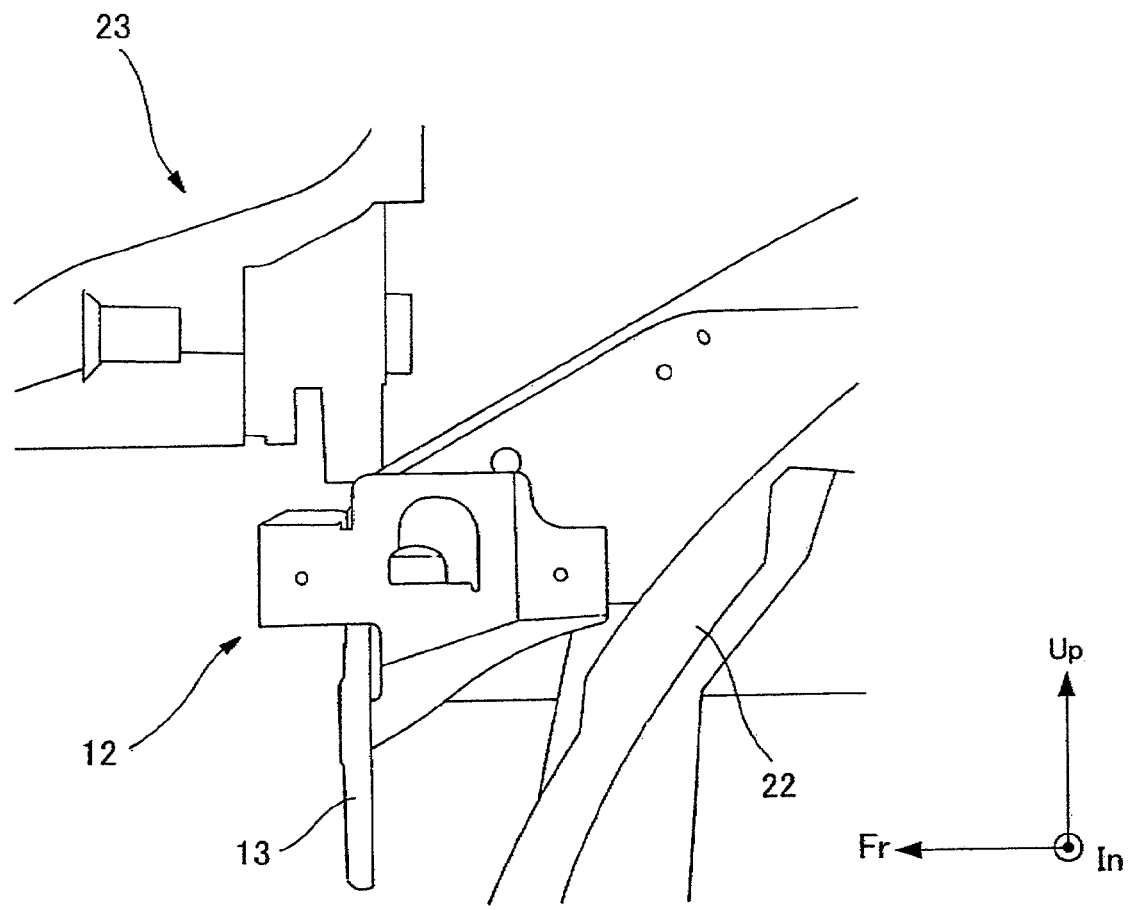
FIG. 9 is a side view of a fender panel structure made of resin concerning the third embodiment before mounting the fender panel.

As shown in FIG. 9, the fender panel bracket 12 is installed at a location above the end part of the bumper reinforcement 11. This location corresponds to substantially between the head lamp 23 and a wheel house 22.

Figure 10:
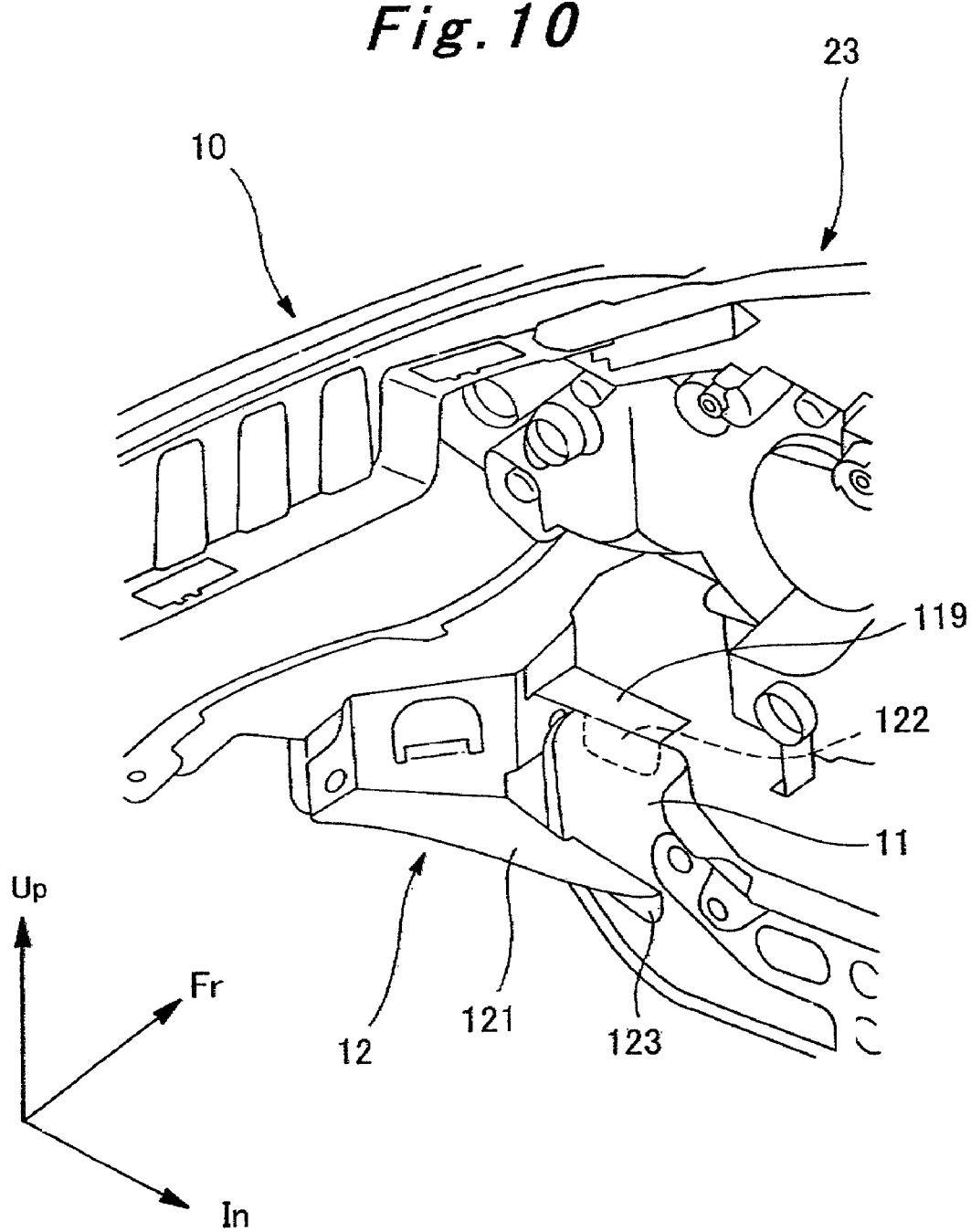
FIG. 10 is a perspective view, seen from an engine room, of the fender panel structure made of resin concerning the third embodiment.

As shown in FIG. 10, the fender panel bracket 12 is installed so that the front mount arm part 119 and the rear mount arm part 121 may sandwich the bumper reinforcement 11. The front mount part 122 of the front mount arm part 119 and the side face of the bumper reinforcement 11 facing forward are coupled together by welding. The rear mount part 123 of the rear mount arm part 121 and the side face of the bumper reinforcement 11 facing backward are also coupled together by welding.

Figure 7:
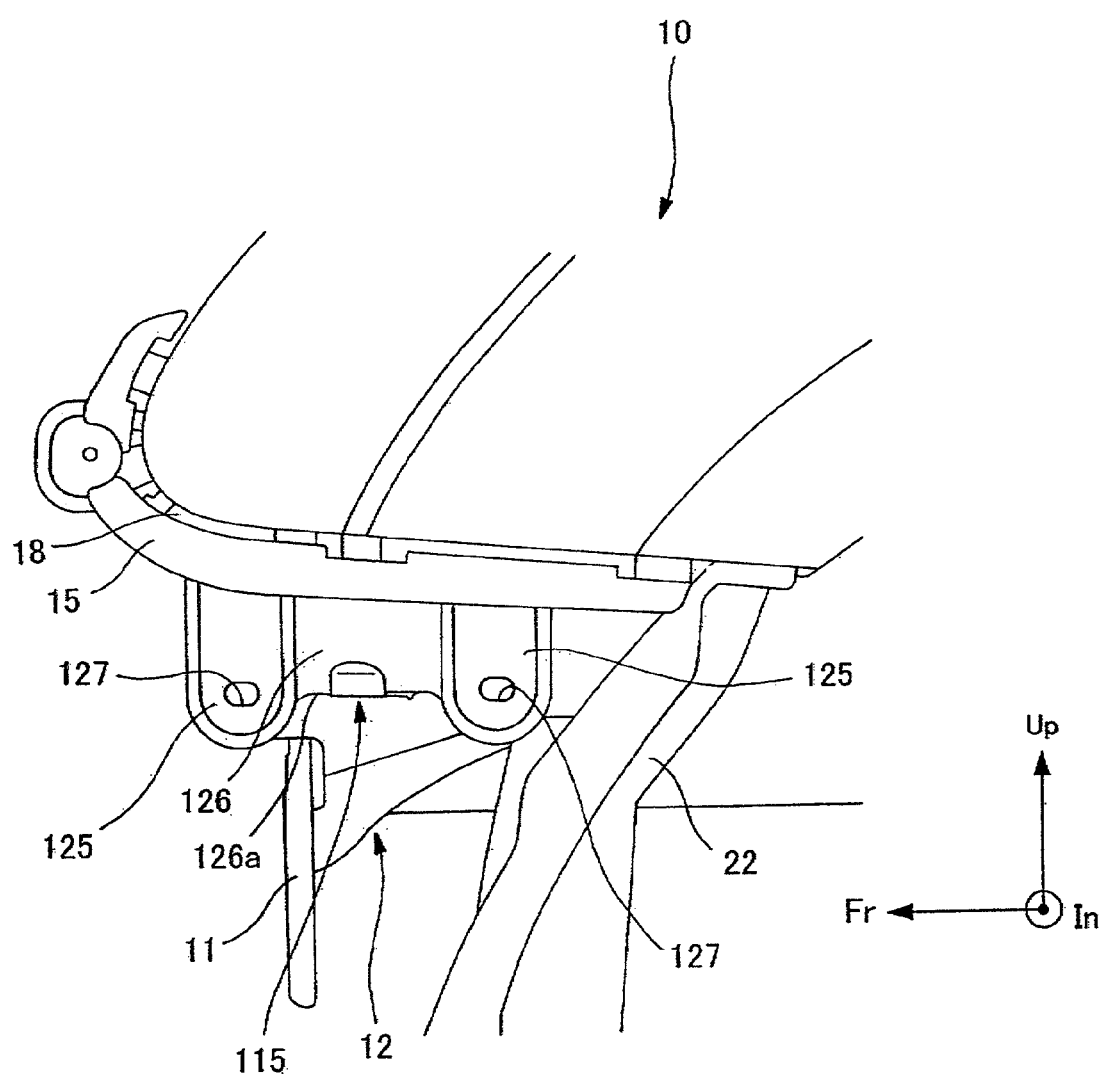
FIG. 7 is a side view of a mount structure of a fender panel made of resin concerning a third embodiment.

As shown in FIG. 7, in the lower part of the front part of the fender panel 10, there are provided a bumper facia fitting part 18 for fitting the end part of the bumper facia 13 therein and mounting the bumper facia 13, and the reinforcement part 15 extending along the edge of the outer plate part 14 of the fender panel 10. In the lower part of this reinforcement part 15, there is provided a fender panel bracket coupling part 125 that couples with the fender bracket 114. This fender panel bracket coupling part 125 is formed in a shape corresponding to that of the fender panel bracket 12. In this embodiment, the fender panel bracket coupling part 125 is the mount part described in Summary of the Invention.

The center of a portion between the fender panel bracket coupling parts 125 is formed as a recess 126. A lower end face 126a of this recess 126 is received in contact with a fender panel receiving part 115a (see FIG. 8) that is a portion of the bottom support hook part 115, the portion extending in the horizontal direction. The width in the vehicle width direction of this fender panel receiving part 115a is wider than the thickness of the recess 126 of the fender panel bracket coupling part 125. Accordingly, the bottom support hook part 115 easily receives the recess 126. In this embodiment, the fender panel receiving part 115a is the receiving face described in Summary of the Invention.

Moreover, in the fender panel bracket coupling part 125, a bolt through-hole 127 is provided at a location corresponding to the bolt installation hole 116 (see FIG. 8), which is provided in the fender panel bracket 12 so that the bolt may pass therethrough when coupling the fender panel bracket 12 with the fender panel bracket coupling part 125.

As described above, according to the fender panel mount structure concerning this embodiment, in the fender panel structure formed of resin, the fender panel structure is disposed above a vehicle's wheel and forms an outer plate on the side face of the vehicle. In this fender panel structure formed of resin, the fender panel bracket 12 that supports the front part of the fender panel 10 made of resin from below is provided on the vehicle body side. In addition, the fender panel bracket 12 has the substantially horizontal fender panel receiving part 115a and allows the direction, to which the fender panel 10 made of resin thermally deforms, to be in the direction along the fender panel receiving part 115a. At the same time, the fender panel bracket 12 restricts the direction intersecting with the fender panel receiving part 115a by causing the fender panel 10 made of resin in contact with the fender panel receiving part 115a. Accordingly, the front part of the fender panel 10 may be prevented from extending downward at painting, so that the deformation of the fender panel 10 after painting may be controlled.

Moreover, the fender panel bracket 12 and the fender panel bracket coupling part 125 include the bolt installation hole 116 for installing a bolt, so that the expansion of the fender panel 10 at painting may no longer be a concern. Accordingly, a dedicated sliding clip, washer, or the like is no longer needed, thereby allowing the cost to be reduced.

Moreover, the fender panel bracket 12 and the fender panel bracket coupling part 125 are coupled together after painting, thereby allowing the front part of the fender panel 10 to be deformed freely in the directions other than downwards at painting. Thus, after the painting, the fender panel bracket 12 and the fender panel bracket coupling part 25 may be coupled together securely.

Fourth Embodiment

Figure 12:
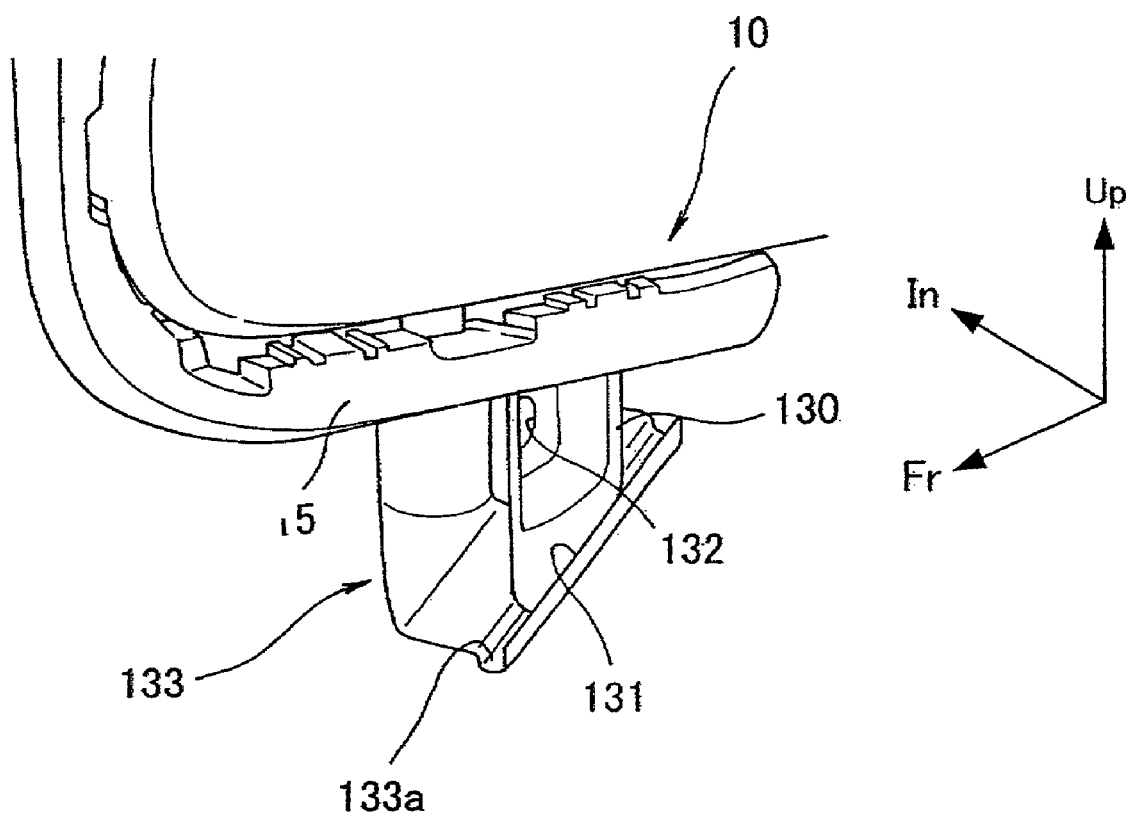
FIG. 12 is a perspective view of a mount structure of a fender panel made of resin concerning a fourth embodiment.

Hereinafter, a fender panel structure concerning this embodiment will be described. A fender panel structure made of resin concerning this embodiment has been modified from the structure of a fender panel bracket 12 and fender panel bracket coupling part 125 of the fender panel structure made of resin concerning the third embodiment. That is, the fender panel structure made of resin concerning this embodiment is substantially the same as that concerning the third embodiment, other than those of the fender panel bracket 12 and the fender panel bracket coupling part 125. As shown in FIG. 12, the fender panel bracket coupling part 130 of the fender panel 10 concerning this embodiment has a structure, in which the fender panel bracket coupling part 125 (see FIG. 7) and a recess of the fender panel bracket coupling part 126 (see FIG. 7) concerning the third embodiment are integrated together. This is referred to as an integral-type fender panel bracket coupling part 130.

Specifically, the integral-type fender panel bracket coupling part 130 is provided in a lower part of a reinforcement part 15 provided at a corner of the front lower part of the fender panel 10 so as to extend downward. The integral-type fender panel bracket coupling part 130 is shaped so that a lower end face 131 thereof is inclined, and this slope is substantially in parallel with the slope of a hood 134 (see FIG. 13). A bolt through-hole 132 for installing a bolt is installed in the center of the integral-type fender panel bracket coupling part 130.

The integral-type fender panel bracket coupling part 130 is received by an inclined type fender panel bracket 133 whose face for receiving the integral-type fender panel bracket coupling part 130 (hereinafter, referred to as an inclined type bottom support face 133a) is inclined. The inclined type bottom support face 133a of this inclined type fender panel bracket 133 is substantially in parallel to an aligning face 110a between the hood 134 and the fender panel 10. Moreover, the lower end face 131 of the integral-type fender panel bracket coupling part 130 is substantially in parallel with the inclined type bottom support plane 133a. That is, the aligning face 110a between the hood 134 and the fender panel 10, and the lower end face 131 of the integral-type fender panel bracket coupling part 130 are substantially in parallel.

Figure 13:
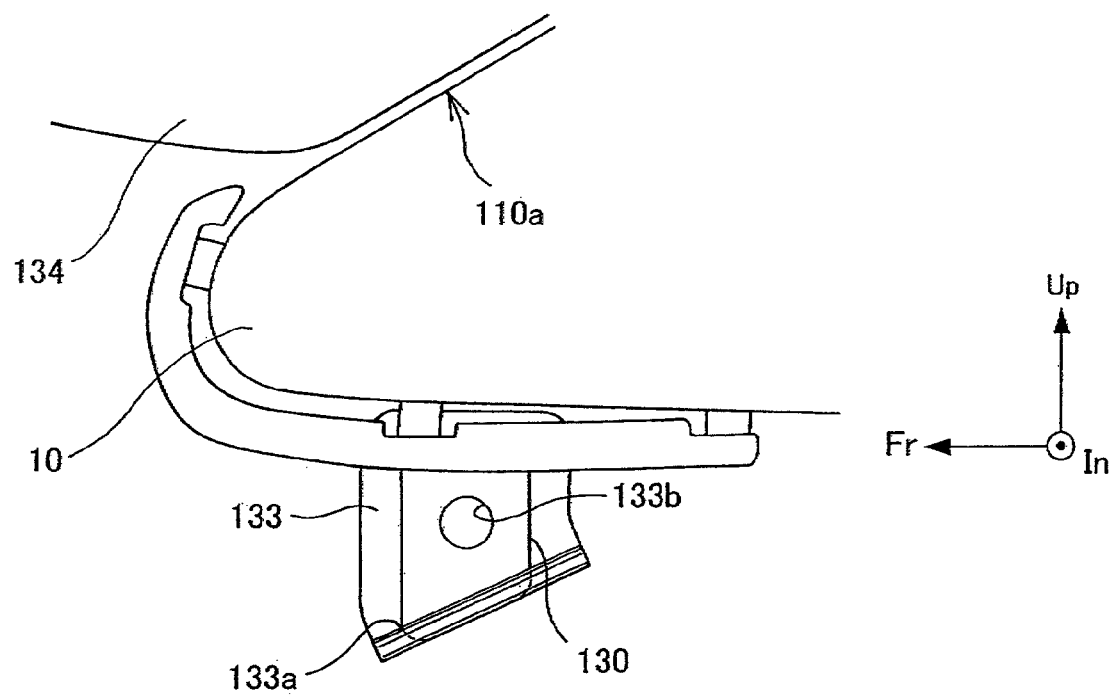
FIG. 13 is a side view of a fender panel bracket concerning the fourth embodiment.

As shown in FIG. 13, in the approximately center of the inclined type fender panel bracket 133, a bolt installation hole 133b is provided at a location corresponding to the bolt through-hole 132 (see FIG. 12) provided in the integral-type fender panel bracket coupling part 130 (see FIG. 12). The integral-type fender panel bracket coupling part 130 and the inclined type fender panel bracket 133 are coupled together by passing a bolt through these bolt through-hole 132 and bolt installation hole 133b. Namely, in the fender panel structure made of resin concerning this embodiment, the integral-type fender panel bracket coupling part 130 plays the roles of the fender panel bracket coupling part 125 (see FIG. 7) and the recess of the fender panel bracket coupling part 126 (see FIG. 7) of the third embodiment.

As described above, according to the fender panel structure concerning this embodiment, the fender panel structure made of resin of a vehicle includes the fender panel 10 formed of resin. In this fender panel structure, the fender panel 10 is disposed above a wheel of the vehicle and forms an outer plate on the side face of the vehicle. The hood 134 made of resin is adjacent to the fender panel 10. The inclined type fender panel bracket 133 that supports the front part of the fender panel 10 made of resin from below is provided on the vehicle body side. The inclined type fender panel bracket 133 has the inclined type bottom support face 133a that is substantially in parallel to the aligning part 110a with the hood 134 in the fender panel 10 made of resin. Here, the inclined type fender panel bracket 133 allows the direction, to which the fender panel 10 made of resin thermally deforms, to be in the direction along the inclined type bottom support face 133a. At the same time, the inclined type fender panel bracket 133 restricts the direction intersecting with the inclined type bottom support face 133a by causing the fender panel 10 made of resin in contact with the inclined type bottom support face 133a. Accordingly, this facilitates the deformation into the extending direction of the aligning part 110a with the hood 134, and prevents the deformation into the hood 134 direction. Thus, the interference with the hood 134 may be prevented.

Moreover, in the fender panel 10 made of resin, the integral-type fender panel bracket coupling part 130 is provided for fixing the fender panel made of resin 10 to the inclined type fender panel bracket 133. This is located in the vicinity of the lower end face 131 of the integral-type fender panel bracket coupling part that is in contact with the inclined type bottom support face 133a. Accordingly, this allows the structure to be simplified, so that the manufacturing cost may be reduced.

Fifth Embodiment

Hereinafter, a fender panel structure concerning this embodiment will be described. A fender panel structure made of resin concerning this embodiment has been modified from the inclined type fender panel bracket 133 of the fender panel structure made of resin concerning the fourth embodiment, and from the structure of the integral-type fender panel bracket coupling part 130.

Specifically, the inclined type bottom support face 133a of the inclined type fender panel bracket 133 is made horizontal, and the lower end face 131 of the integral-type fender panel bracket coupling part 130 is also made horizontal. Here, the fender panel bracket concerning this embodiment is referred to as a horizontal type fender panel bracket 140 (see FIG. 14). Moreover, the fender panel structure made of resin concerning this embodiment is substantially the same as that concerning the second embodiment, other than those of the inclined type fender panel bracket 133 and the integral-type fender panel bracket coupling part 130.

Figure 14:
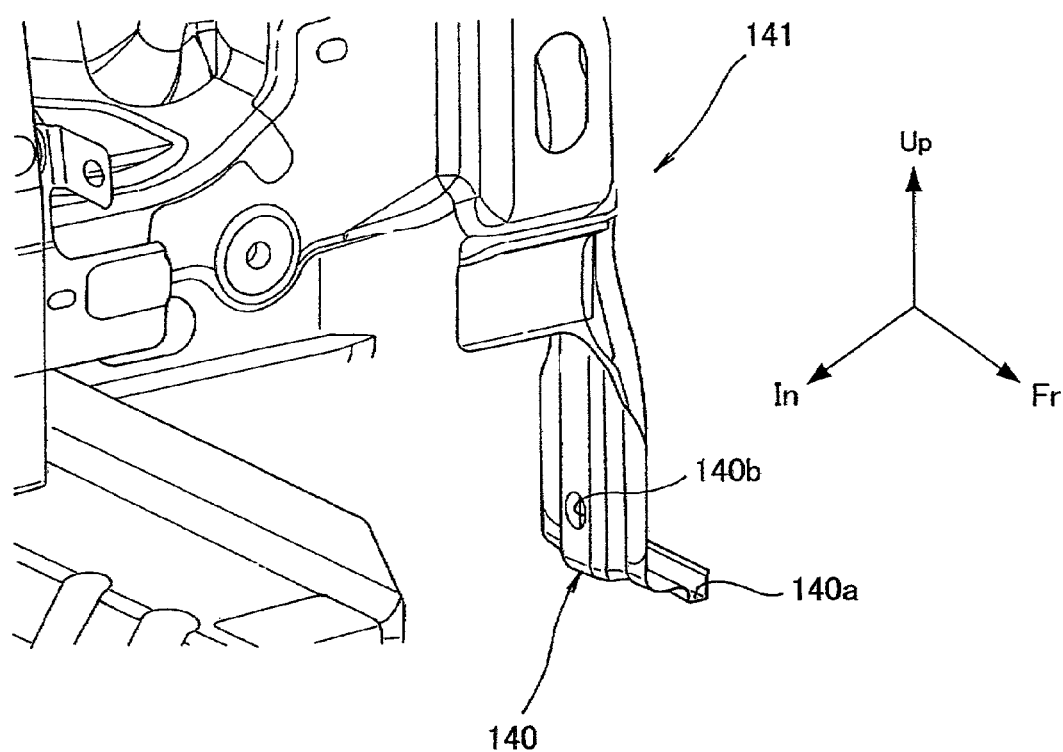
FIG. 14 is a perspective view, seen from an inner side in the vehicle width direction, of a mount structure of a fender panel made of resin concerning a fifth embodiment.

As shown in FIG. 14, a fender panel bracket 140 concerning this embodiment is provided in the lower part of the front end portion on the outer side in the vehicle width direction of the vehicle body frame 141 so as to extend downward. That is, the fender panel bracket 140 concerning this embodiment is integrally formed with the vehicle body frame 141. Moreover, a bolt installation hole 140b for installing a bolt is installed in the center of the fender panel bracket 140.

Figure 15:
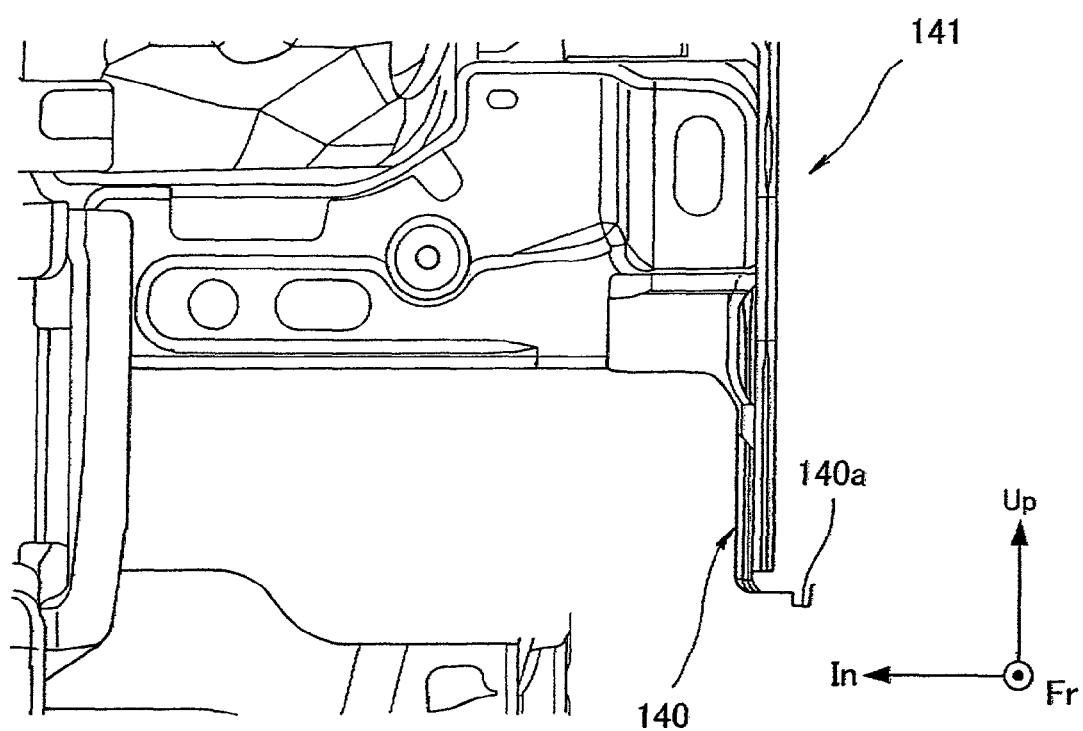
FIG. 15 is a side view, seen from the vehicle front, of the fender panel structure made of resin concerning the fifth embodiment.

As shown in FIG. 15, in the horizontal type fender panel bracket 140 concerning this embodiment, a horizontal face 140a for receiving the fender panel bracket coupling part is horizontal. Accordingly, the shape of the lower end face of the integral-type fender panel bracket coupling part 130 (see FIG. 12) is also horizontal.

As described above, according to the fender panel structure formed of resin concerning this embodiment, the horizontal type fender panel bracket 140 is integrally formed with the vehicle body frame 141. Thus, this allows the coupling strength with the vehicle body frame 141 to be improved and also allows the number of components to be reduced, so that the cost may be reduced.

What is claimed is:

1. A fender panel structure comprising a fender panel formed of resin, disposed above a vehicle's wheel and forming an outer plate on the side face of the vehicle, the fender panel comprising:
    an outer plate part exposed to the side face of the vehicle;
    an adjacent member disposed next to the outer plate part;
    a reinforcement part disposed in the back face of the adjacent member, extending along an edge of the outer plate part, and formed of resin integrally with the outer plate part;
    a fitting part, into which the adjacent member fits, formed along the interstice between the edge of the outer plate part and the reinforcement part;
    a mount part to the vehicle formed in the reinforcement part;
    bottom support means provided in the vehicle and supporting a front part of the fender panel from below;
    a receiving face formed in the bottom support means and being substantially horizontal; and
    a contact part formed in a lower edge of the mount part, the contact part allowing the direction, to which the fender panel thermally deforms, to be in the direction along the receiving face, and at the same time the contact part restricting the heat deformation in the direction intersecting with the receiving face by causing the fender panel to come into contact with the receiving face.

2. The fender panel structure according to claim 1, wherein the mount part is mounted to the vehicle via the bottom support means.

3. The fender panel structure according to claim 1, wherein a bolt installation hole for installing a bolt is formed in each of the bottom support means and the mount part.

4. The fender panel structure according to claim 1, wherein the bottom support means and the mount part are coupled together after painting.

\* \* \* \* \*